United States Patent
Biswas et al.

(10) Patent No.: US 7,895,329 B2
(45) Date of Patent: Feb. 22, 2011

(54) PROTOCOL FLOW CONTROL

(75) Inventors: Amitabha Biswas, Cupertino, CA (US); Prashant Modi, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1333 days.

(21) Appl. No.: 11/332,035

(22) Filed: Jan. 12, 2006

(65) Prior Publication Data

US 2007/0162559 A1    Jul. 12, 2007

(51) Int. Cl.
- G06F 15/173 (2006.01)
- G06F 15/16 (2006.01)
- G06F 15/167 (2006.01)
- G06F 13/00 (2006.01)
- G06F 13/28 (2006.01)
- G06F 3/00 (2006.01)

(52) U.S. Cl. ............... 709/226; 709/212; 709/216; 709/217; 709/223; 709/224; 709/225; 709/232; 709/233; 709/234; 709/235; 709/245; 711/154; 719/314

(58) Field of Classification Search ......... 709/212–216, 709/223–226, 217, 232–235, 245; 370/229–240; 711/154; 719/314
See application file for complete search history.

(56) References Cited

U.S. PATENT DOCUMENTS

| | | | | |
|---|---|---|---|---|
| 5,528,591 A * | 6/1996 | Lauer | ............... | 370/231 |
| 6,044,406 A * | 3/2000 | Barkey et al. | ............... | 709/235 |
| 6,046,983 A * | 4/2000 | Hasegawa et al. | ......... | 370/236.1 |
| 6,327,254 B1 * | 12/2001 | Chuah | ............... | 370/328 |
| 6,460,080 B1 * | 10/2002 | Shah et al. | ............... | 709/224 |
| 6,594,701 B1 * | 7/2003 | Forin | ............... | 709/232 |
| 6,683,850 B1 * | 1/2004 | Dunning et al. | ............... | 370/231 |
| 6,820,129 B1 * | 11/2004 | Courey, Jr. | ............... | 709/234 |
| 6,898,638 B2 * | 5/2005 | Frazier et al. | ............... | 709/232 |
| 6,981,051 B2 * | 12/2005 | Eydelman et al. | ............... | 709/232 |
| 7,062,568 B1 * | 6/2006 | Senevirathne et al. | ....... | 709/234 |
| 7,085,846 B2 * | 8/2006 | Jenne et al. | ............... | 709/232 |
| 7,103,672 B1 * | 9/2006 | Sharma | ............... | 709/232 |
| 7,161,907 B2 * | 1/2007 | Mott | ............... | 370/232 |
| 7,281,030 B1 * | 10/2007 | Davis | ............... | 709/212 |
| 7,342,934 B1 * | 3/2008 | Mott et al. | ............... | 370/412 |
| 2001/0051972 A1 * | 12/2001 | Eydelman et al. | ............... | 709/200 |
| 2002/0021678 A1 * | 2/2002 | Heatwole et al. | ............... | 370/325 |
| 2002/0091852 A1 * | 7/2002 | Frazier et al. | ............... | 709/232 |
| 2002/0159385 A1 * | 10/2002 | Susnow et al. | ............... | 370/229 |
| 2003/0061296 A1 * | 3/2003 | Craddock et al. | ............... | 709/212 |
| 2004/0010612 A1 * | 1/2004 | Pandya | ............... | 709/230 |
| 2004/0019882 A1 * | 1/2004 | Haydt | ............... | 717/151 |
| 2004/0037319 A1 * | 2/2004 | Pandya | ............... | 370/469 |
| 2004/0049600 A1 * | 3/2004 | Boyd et al. | ............... | 709/250 |
| 2005/0015459 A1 * | 1/2005 | Gole et al. | ............... | 709/212 |
| 2005/0228900 A1 * | 10/2005 | Stuart et al. | ............... | 709/234 |
| 2006/0075057 A1 * | 4/2006 | Gildea et al. | ............... | 709/212 |
| 2006/0227799 A1 * | 10/2006 | Lee | ............... | 370/429 |
| 2006/0230119 A1 * | 10/2006 | Hausauer et al. | ............... | 709/216 |

* cited by examiner

*Primary Examiner*—Nathan Flynn
*Assistant Examiner*—Kai J Chang

(57) ABSTRACT

In a flow control method, operation flow is controlled on a per connection basis. The method comprises managing a sending peer to prevent overflow of a receiving peer's receiver credits and allocating a number of send buffers at the sending peer greater than or equal to the maximum number of receiver credits that can be indicated by the receiving peer. The technique prevents the sending peer from overflowing its set of send buffers, arising due to re-use, without taking completions on operations queued to a Send Queue.

20 Claims, 6 Drawing Sheets

| SEQUENCE NUMBER | NODE | OPERATION | NUMBER OF COMPLETIONS IN NON-OPTIMIZED ALGORITHM | NUMBER OF COMPLETIONS IN OPTIMIZED ALGORITHM |
| --- | --- | --- | --- | --- |
| 1) | SINK | BIND | 0 | 0 |
| 2) | SINK | SEND(ADVERTISE) | 1 | 0 |
| 3) | SOURCE | RECEIVE | 1 | 1 |
| 4) | SOURCE | RDMA WRITE | 1 | 1 |
| 5) | SOURCE | SEND | 1 | 0 |
| 6) | SINK | RECEIVE | 1 | 1 |
| 7) | SINK | UNBIND | 1 | 1 |
| | | TOTAL | 6 | 4 |

FIG. 5

PROTOCOL FLOW CONTROL

BACKGROUND

In fields of computing, communications, data storage, and the like, information may be transferred from a system memory associated with one computer system to a system memory associated with another computer system. Communication between computer systems may involve exchanging and processing messages through a proprietary protocol stack at each of the computer systems.

The Remote Direct Memory Access Consortium (RD-MAC) has specified a set of verbs that enable an operating system to supply an infrastructure that supports Remote Direct Memory Access (RDMA) over Internet Wide Area RDMA Protocol (iWARP) technology using Queue Pair (QP) semantics. The infrastructure may include a flow control protocol for performing data transfer operations. The RDMA-capable protocol may be constructed in a manner that is not cognizant of the underlying fabric infrastructure, for example iWARP. Windows Sockets Direct (WSD) and Sockets Direct Protocol (SDP) are two example protocols that support RDMA semantics over a variety of interconnect fabrics and can use QP semantics.

WSD and SDP are connection-oriented protocols. Once a connection is established, data transfer can be performed using RDMA transfers, characterized as application buffer to application buffer transfers, or non-RDMA transfers, which are protocol buffer to protocol buffer transfers. Each end of a connection that uses QP semantics includes a QP composed of a Send Queue and a Receive Queue. Each send operation, including one or more protocol buffers, is posted on the Send Queue and each receive operation, including one or more protocol buffers, is posted on the Receive Queue of that connection. Operations are processed in the sequence queued. Each queued operation can choose to take a completion. The completions are queued to a Completion Queue (CQ) associated with the QP upon processing of the queued operation.

SUMMARY

In accordance with an embodiment of a flow control method, operation flow is controlled on a per connection basis. The method comprises managing a sending peer to prevent overflow of a receiving peer's receiver credits and allocating a number of send buffers at the sending peer greater than or equal to the maximum number of receiver credits that can be indicated by the receiving peer. The technique prevents the sending peer from overflowing its set of send buffers, arising due to re-use, without taking completions on operations queued to a Send Queue.

BRIEF DESCRIPTION OF THE DRAWINGS

Embodiments of the invention relating to both structure and method of operation may best be understood by referring to the following description and accompanying drawings:

FIG. 5 is a table that depicts an example analysis of communication system operations for comparing the illustrative optimized flow control method and a non-optimized method.

DETAILED DESCRIPTION

A flow control technique is adapted to perform a send operation without requiring a completion to be taken on that particular send operation. In a particular implementation, a Remote Dynamic Memory Access (RDMA) protocol software flow control mechanism does not require taking of completions for send operations.

One of the fundamental goals of RDMA/iWARP technology is to reduce software processing for connections established using RDMA semantics. A software flow control protocol that is configured to take a completion for every send operation is suboptimal on the basis of efficiency. The flow control technique disclosed herein eliminates the need to take completions for send operations.

If flow control is implemented at a per connection level, the flow control protocol operates under the following restrictions. First, the sending peer must have information about the number of receive credits available at the receiving peer and must not overflow the receiving peer's posted receive credits. Second, the flow control protocol must not overflow the send queue local to the protocol.

The simplest method a flow control protocol can use to comply with the second restriction and avoid overflowing the local send queue is to take a completion for every send operation. A problem with the simple approach is that each "send" completion that is generated consumes cycles in a network interface controller such as Network Interface Card (NIC) hardware in the process of generating a completion, and in host software to process the completion. The simple method may be called a "non-optimized" solution.

A flow control protocol that takes a completion for every send operation is sub-optimal. Improved efficiency may be sought. The structures, systems, and methods disclosed herein reduce software processing for connections. In particular implementations, the disclosed structures, systems, and methods reduce software processing for connections established using RDMA semantics in RDMA/iWARP technology.

Figure 1:
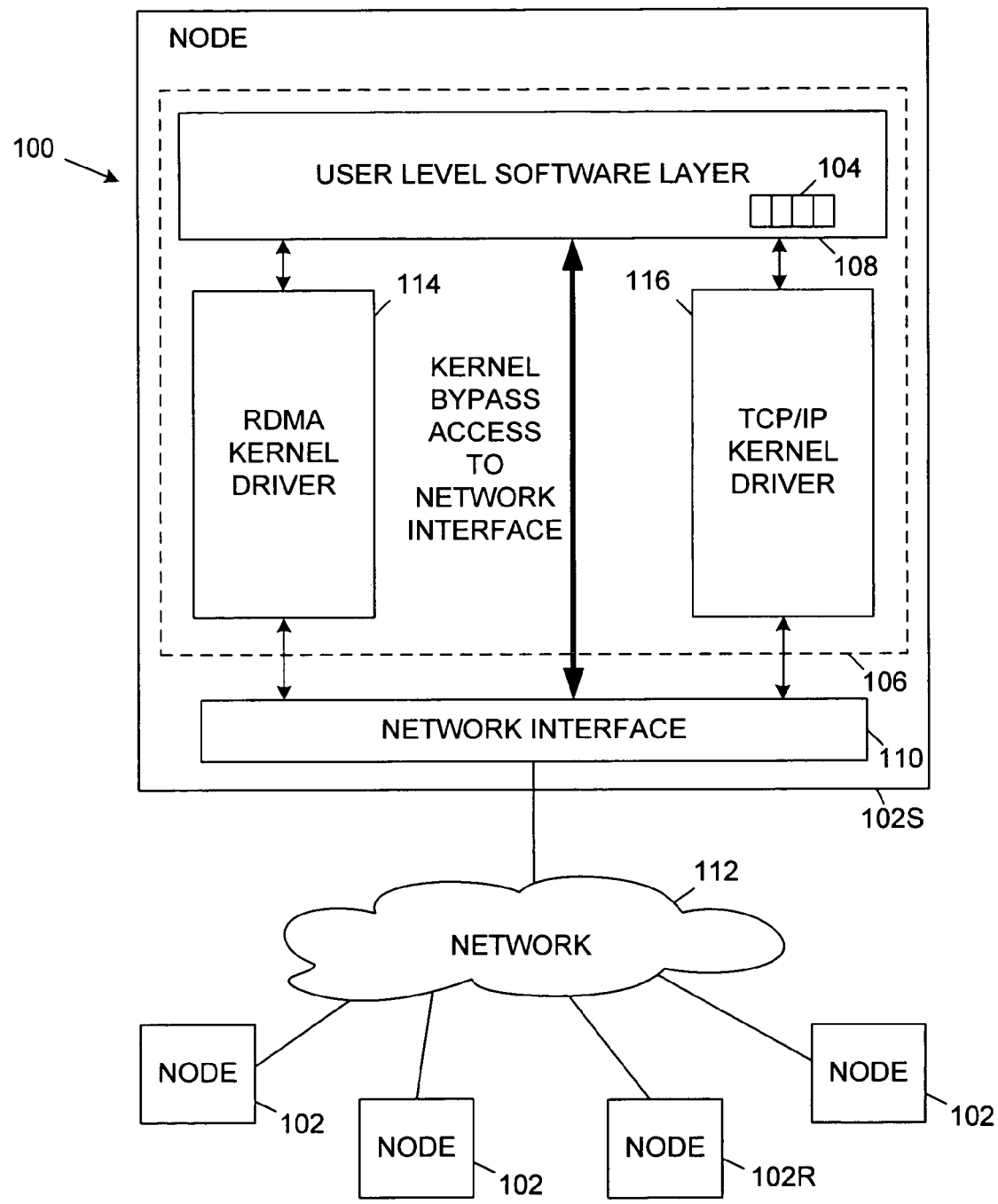
FIG. 1 is a schematic block diagram illustrating an embodiment of a flow control apparatus which is adapted to execute a protocol that can perform send operations without taking completions.

Referring to FIG. 1, a schematic block diagram illustrates an embodiment of a flow control apparatus 100 adapted to execute a protocol that can perform send operations without taking completions. The flow control apparatus 100 comprises a node 102S which is operative as a sending peer that is adapted to control operation flow on a per connection level. The node 102S comprises a plurality of send buffers 104. A logic 106 operative at the node 102S is adapted to manage the sending peer to prevent overflow of a receiving peer's receiver credits and to allocate a number of send buffers 104 at the sending peer greater than or equal to the maximum number of receiver credits that can be indicated by the receiving peer.

The flow control apparatus 100 operates in compliance with flow control restrictions whereby, first, the sending peer 102S maintains information about the number of receive credits that are available at the receiving peer 102R and avoids or prevents overflow of the receiving peer's posted receive credits. Second, the flow control apparatus 100 executes a flow control protocol so that the send protocol buffers are not used prematurely. Accordingly, protocol send buffers are not re-used without validating that the previous operation on the same send buffer has completed. The flow control apparatus 100 implements an embodiment of an optimized solution which proves that the second restriction can be guaranteed automatically assuming that the first restriction and one or more additional factors are guaranteed. Accordingly, the flow control protocol is not required to take a completion on every send operation to guarantee the second restriction so long as the following conditions are enforced.

One condition is that the first restriction is enforced, the flow protocol is managed to prevent overflow of the receiving peer's posted receive credits. In a second condition, the number of send buffers 104 at the sending peer 102S which are involved in flow control is set to be greater than or equal to the maximum number of receiver credits that can be indicated by the receiving peer 102R.

The number of send buffers 104 is set to be greater than or equal to the maximum number of receiver credits because, in a standard communication protocol, the receiver typically does not have information about the number of send buffers at the sending peer. In the standard protocol, the receiver returns an acknowledge (ACK) only when all receiver buffers are filled by sender's data. If the number of send buffers were allowed to be smaller than the maximum number of receiver credits, the ACK would occur only when more sends than the number of send buffers completed. Accordingly, at least one send buffer on the sending peer was re-used without an ACK from the receiver peer. Since all sends can occur in parallel, whether a first send on the re-used send buffer actually completed before the second send cannot be determined without taking completions. Therefore the send buffer can have data overwritten by the second send in absence of the stipulation on the number of send buffers.

Compliance with the conditions ensures that the flow control protocol does not require taking of a completion on a send operation.

Other conditions may be implemented to facilitate the protocol. For example, the receiving peer 102R can notify the sending peer 102S when receive credits are replenished. In another optional example condition, the send buffers 104 may be used in a selected order such as a round robin order, a first-in-first-out (FIFO) queue arrangement, random order, or another suitable ordering technique.

Some caveats may be noted with regard to the flow control protocol's compliance with the conditions. First, Internet Wide Area RDMA Protocol (iWARP) imposes that operations queued to the Send Queue take at least one completion per iteration through the Send Queue. In other words, if the size of the Send Queue is X, then at least one in every X operations posted to the Send Queue, including RDMA and send operations, must take a completion. If X is sufficiently large, performance degradation arising from taking completions is negligible. Second, all Remote Direct Memory Access (RDMA) operations should take a completion since RDMA operations involve application memory and hence are to be returned to the application once the queued operation is complete.

The node 102S may comprise a software layer 108 and a network interface 110. The logic 106 is operative to control kernel bypass access to the network interface 110.

In an illustrative embodiment, the logic 106 may track at the sending peer 102S the number of receive credits that are available at the receiving peer 102S, and transfers from the sending peer 102S to the receiving peer 102R only in conditions that the transfer does not overflow the receiving peer's posted receive credits.

The logic 106 reuses a send buffer at the sending peer 102S only in a condition that a previous transfer from the send buffer 104 is completed.

The logic 106 may send notification from the receiving peer 102R to the sending peer 102S that informs the sending peer 102S about the number of receive credits available at the receiving peer 102R. The notification identifies which send buffers 104 at the sending peer 102S are completed.

In the illustrative embodiment, logic 106 is present both at the sending and receiving peers. For example, logic 106 may represent a node that runs a RDMA protocol.

Also referring to FIG. 1, an embodiment of a network 112 is shown comprising a plurality of systems, depicted as nodes 102. At least one of the systems 102 is adapted to execute a process. At least one node 102S adapted to communicate a data packet from at least one of the systems and is operative as a sending peer, adapted to control operation flow on a per connection level. The node 102S further comprises a plurality of send buffers 104 at the node 102S and a logic 106. The logic 106 is operative at the node 102S and manages the sending peer 102S to prevent overflow of a receiving peer's receiver credits, allocating a number of send buffers 104 at the sending peer 102S which is greater than or equal to the maximum number of receiver credits that can be indicated by the receiving peer 102R.

An embodiment of the flow control apparatus 100 may include other components, for example one or more switches, a network interface such as a network interface card (NIC) driver, a network adapter, a dynamic link library, and the like. User-level software applications 108 may include any suitable application. Examples of user-level applications 108 include Remote Direct Memory Access (RDMA), Internet Wide Area RDMA Protocol (iWARP), RDMA over Transmission Control Protocol (TCP), Windows™ sockets (Winsock)-compliant applications, and others. The flow control apparatus 100 may further include a RDMA kernel driver 114 and a TCP/IP driver 116. The TCP/IP kernel driver 116 implements TCP/IP functionality for a system.

Nodes, for example endpoint nodes 102 and 102R but also any other combination of nodes, are connected and communicate via the network 112. The nodes 102, 102S, and 102R may exchange data packets or messages across the network 112 using various protocols, for example a communication protocol, bypass protocol, or others.

The RDMA kernel driver 114 may be a protocol driver for managing communication according to a communication protocol and may enable standard methods for protocol addressing, writing and reading on streams, and/or detecting disconnects for interfacing with an application-programming interface (API). The RDMA kernel driver 114 may comprise Winsock Direct (WSD) or Sockets Direct Protocol (SDP) drivers that may use Remote Direct Memory Access (RDMA) features to bypass the kernel and to reduce the load on a processor within the node 102S. The RDMA kernel driver 114 may also enable connection-oriented service or a port for use by a specific application in communicating with other nodes.

The second driver 116 may be a protocol driver for managing communication according to a TCP/IP protocol. Also, the second driver 116 may support connection-oriented services or ports for usage by a specific application to communicate with other nodes such as node 102R.

The first node 102S may comprise a memory of various types such as static read only memory (SRAM) or dynamic read only memory (DRAM). Memory may store data or information including Internet Protocol (IP) or Media Access Control (MAC) addresses associated with protocols such as a communication protocol and/or a kernel bypass protocol. Individual network interfaces may be assigned separate MAC and IP addresses for each of the communication protocol and the kernel bypass protocol.

Figure 2:
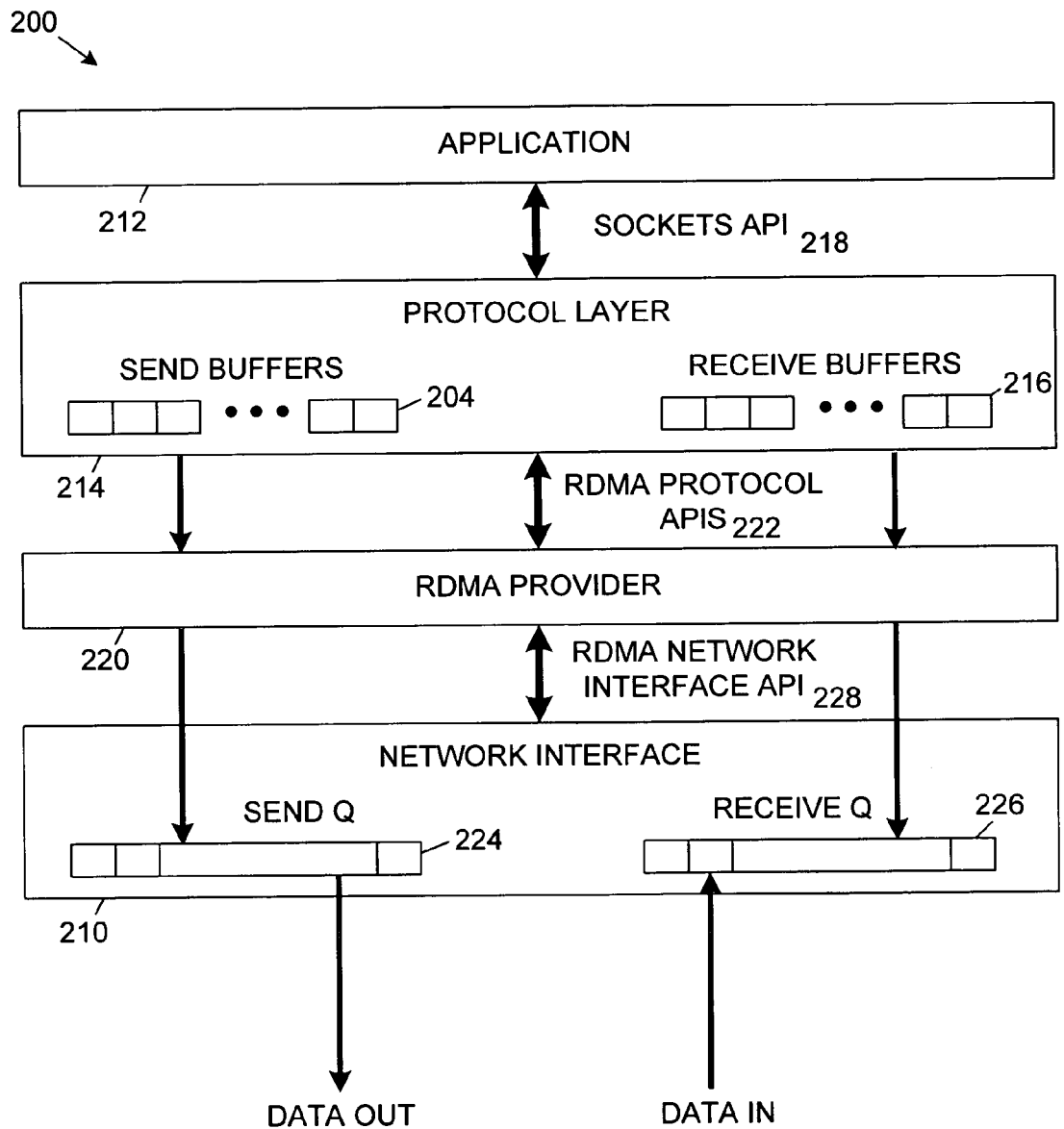
FIG. 2 is a schematic block diagram illustrates an embodiment of software layers in a system that may be implemented in a node.

Referring to FIG. 2, a schematic block diagram illustrates an embodiment of software layers in a system 200 that may be implemented in a node. The system 200 comprises an application 212 and a protocol layer 214. The protocol layer 214 comprises a plurality of send buffers 204 and a plurality of receive buffers 216. The protocol layer 214 communicates with the application 212 via a sockets applications programming interface (API) 218. The system 200 further comprises a provider 220 that communicates with the protocol layer 214 via at least one protocol applications programming interface (API) 222. The system 200 has a network interface 210 comprising a send queue 224 and a receive queue 226. The network interface 210 communicates with the provider 222 via the RDMA Network Interface API 228 that enables iWARP functionality.

The iWARP technology, as developed by RDMAC, usually uses an operating system to form an infrastructure to support Remote Direct Memory Access (RDMA) protocols over the network. The Windows™ operating system supports an infrastructure that enables a provider 220 of iWARP technology to support protocols such as Winsock Direct (WSD) and Sockets Direct Protocol (SDP) over iWARP. WSD and SDP are examples of RDMA protocols. The provider 220 usually has a user-level library that implements iWARP functionality in the form of verbs at a lower edge—the network interface 210—and supports Windows Winsock Service Provider Interface (SPI) at an upper edge—at the protocol layer. For example, the user-level library can translate Winsock SPI to iWARP functionality. The illustrative apparatus and network can implement a suitable provider library.

Each connection in the iWARP technology includes a Queue Pair (QP) composed of a Send Queue 224 and a Receive Queue 226. A send operation includes a buffer or buffers and is posted on the Send Queue 224. A receive operation includes a buffer or buffers and is posted on the Receive Queue 226 of the connection. Operations are completed in the sequence of queuing. When an operation completes, the completion information may be posted to a Completion Queue (CQ) associated with the connection. A completion enables an Upper Layer Protocol (ULP), for example Winsock Direct (WSD) or Sockets Direct Protocol (SDP), to retrieve the buffer associated with the original request and re-use the buffer. The ULP also controls send and receive buffer management of each connection. Buffers used in the protocol are typically non-paged and registered with the iWARP hardware. Accordingly, the ULP is informed that a buffer is available for re-use when the provider library informs about a completed operation. The provider library receives information relating to a completion via a completion posted to the Completion Queue (CQ). Additionally, the ULP can also determine that a send operation has completed based on the receiver credits returned by the receiving side.

Figure 3:
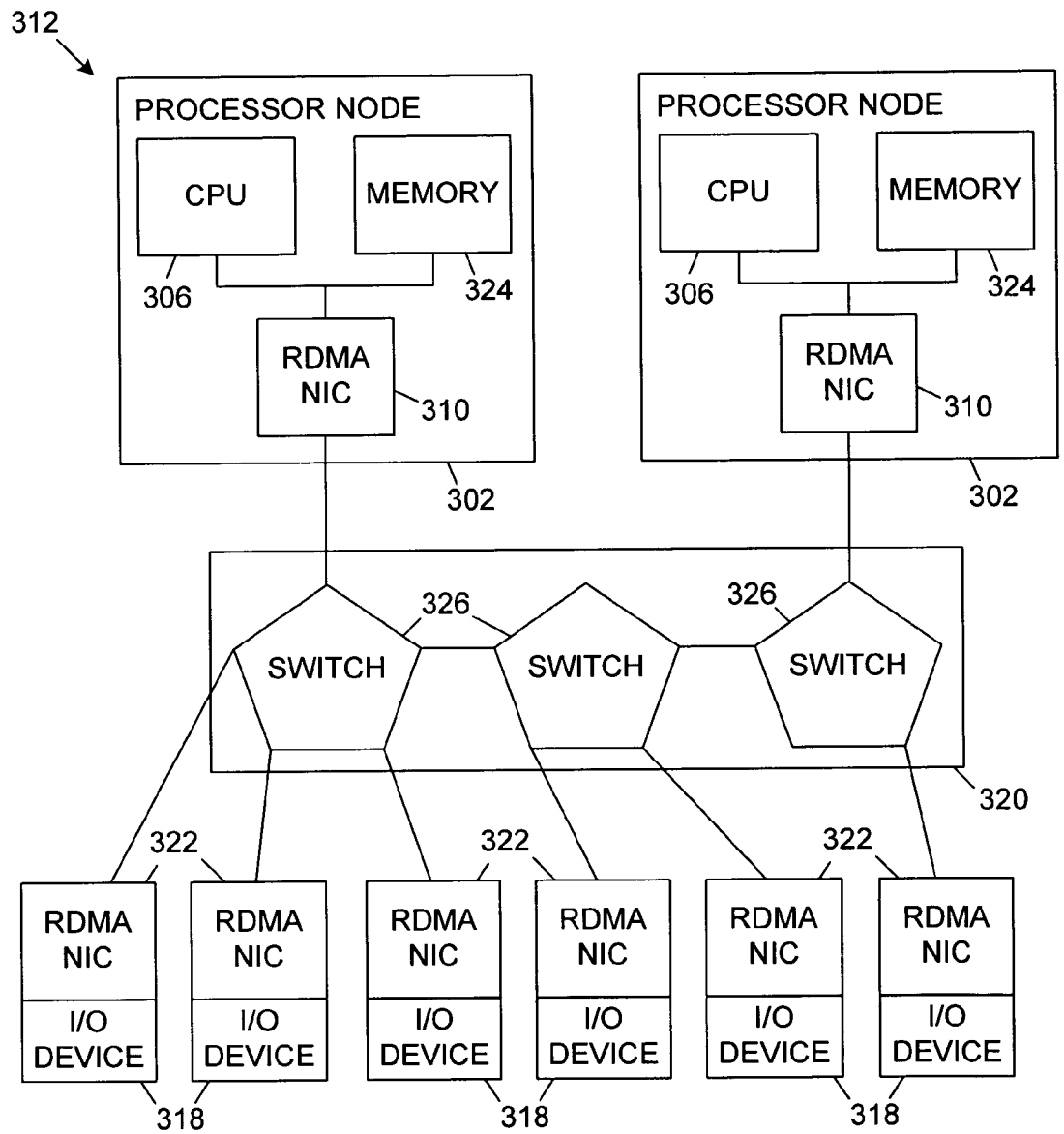
FIG. 3, a schematic block diagram illustrates a network 312 that is suitable for implementing the illustrative flow control apparatus and system.

Referring to FIG. 3, a schematic block diagram illustrates a network 312 that is suitable for implementing the illustrative flow control apparatus and system. The network 312 may comprise processor nodes 302 which may be connected to a plurality of input/output (I/O) devices 318 via a switch network 320. The individual I/O devices 318 may use a Remote Direct Memory Access-enabled Network Interface Card (RNIC) 322 to communicate with the other systems. I/O devices 318 may access memory space of other RDMA-enabled devices via respective RNICs and the switch network 320.

Topology of the network 312 is illustrated as an example. In other arrangements the topology may take many forms based on a range of design considerations. Also, Network Interface Cards 322 that operate according to other protocols, such as InfiniBand, Quadrics, or Myrinet, may be used in networks that employ the protocols for data transfer.

A processor node 302 may include logic 306 such as a Central Processing Unit (CPU), a memory 324, and a Remote Direct Memory Access Network Interface Card (RNIC) 310. Although only one CPU 306 is illustrated in the processor node 302, multiple CPUs may be included in other embodiments or arrangements. The CPU 306 may be a processor, digital signal processor, processing element, state machine, logic, or the like. CPU 306 may include a plurality of processors or other logic. The CPU 306 may be connected to the memory 324 and the RNIC 310 over an internal bus or other connection. Memory 324 may store information for use by the CPU 306, the RNIC 310 or other systems or devices. Memory 324 may be distinct from or integrated into CPU 306 and may include memory controllers and various types of memory, such as Static Random Access Memory (SRAM) or Dynamic Random Access Memory (DRAM).

Network 320 is shown including switches 326 and may, in various embodiments, comprise any combination of hubs, switches, routers, point-to-point links, and the like. I/O devices 318 may be any selection from conventional I/O devices to a bridge, route or other translation device or loopback. Switches 326 in the network 320 may communicate with various RDMA NICs 310, 322 in nodes 302 or associated with I/O devices 318, or other switches 326 internal to the network 320.

The processor nodes 302 and I/O devices 318 may access memory 324 in any node 302 so that memories 324 may be accessible by remote devices, such as I/O devices 318 via the switch network 320 through the use of a protocol. The processor nodes 302 and I/O devices 318 may exchange information using protocols.

Figure 4A:
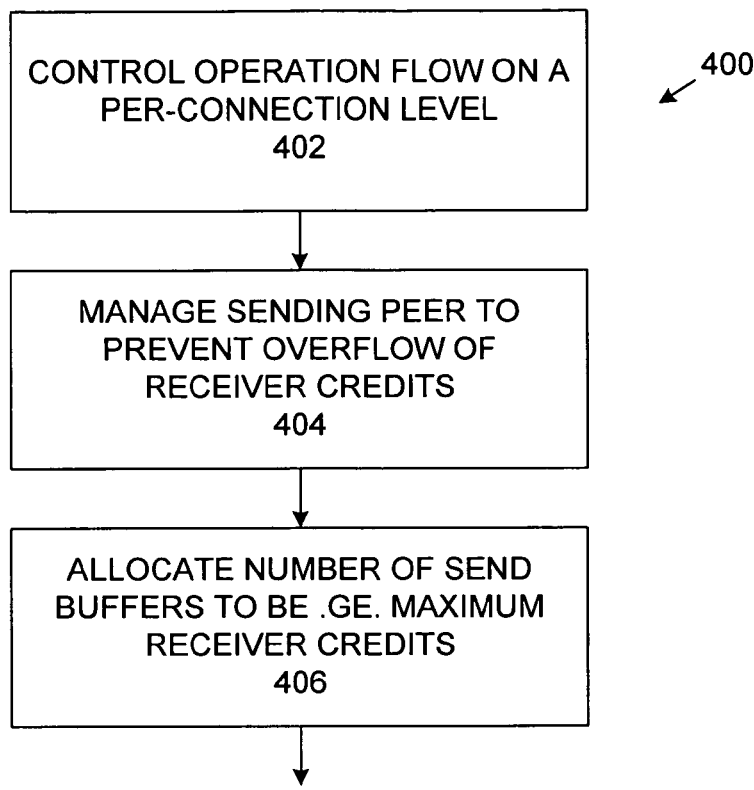
FIGS. 4A, 4B, and 4C are flow charts depicting embodiments of flow control method aspects for a method that reduces processing for connections in a communication system.

Referring to FIG. 4A, a flow chart depicts an embodiment of a flow control method 400 that reduces processing for connections in a communication system. The flow control method comprises controlling 402 operation flow on a per connection level. A sending peer is managed 404 to prevent overflow of a receiving peer's receiver credits. The number of send buffers at the sending peer is allocated 406 to be greater than or equal to the maximum number of receiver credits that can be indicated by the receiving peer.

Figure 4B:
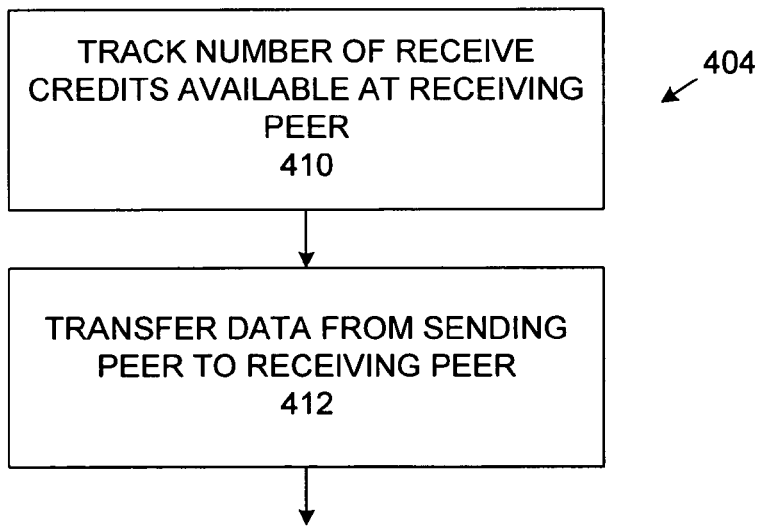

Referring to FIG. 4B, in an embodiment of the managing operation 404, at the sending peer the number of receive credits available at the receiving peer is tracked 410. Data for a send operation is transferred 412 from the sending peer to the receiving peer only in conditions that the transfer does not overflow the receiving peer's posted receive credits.

Figure 4C:
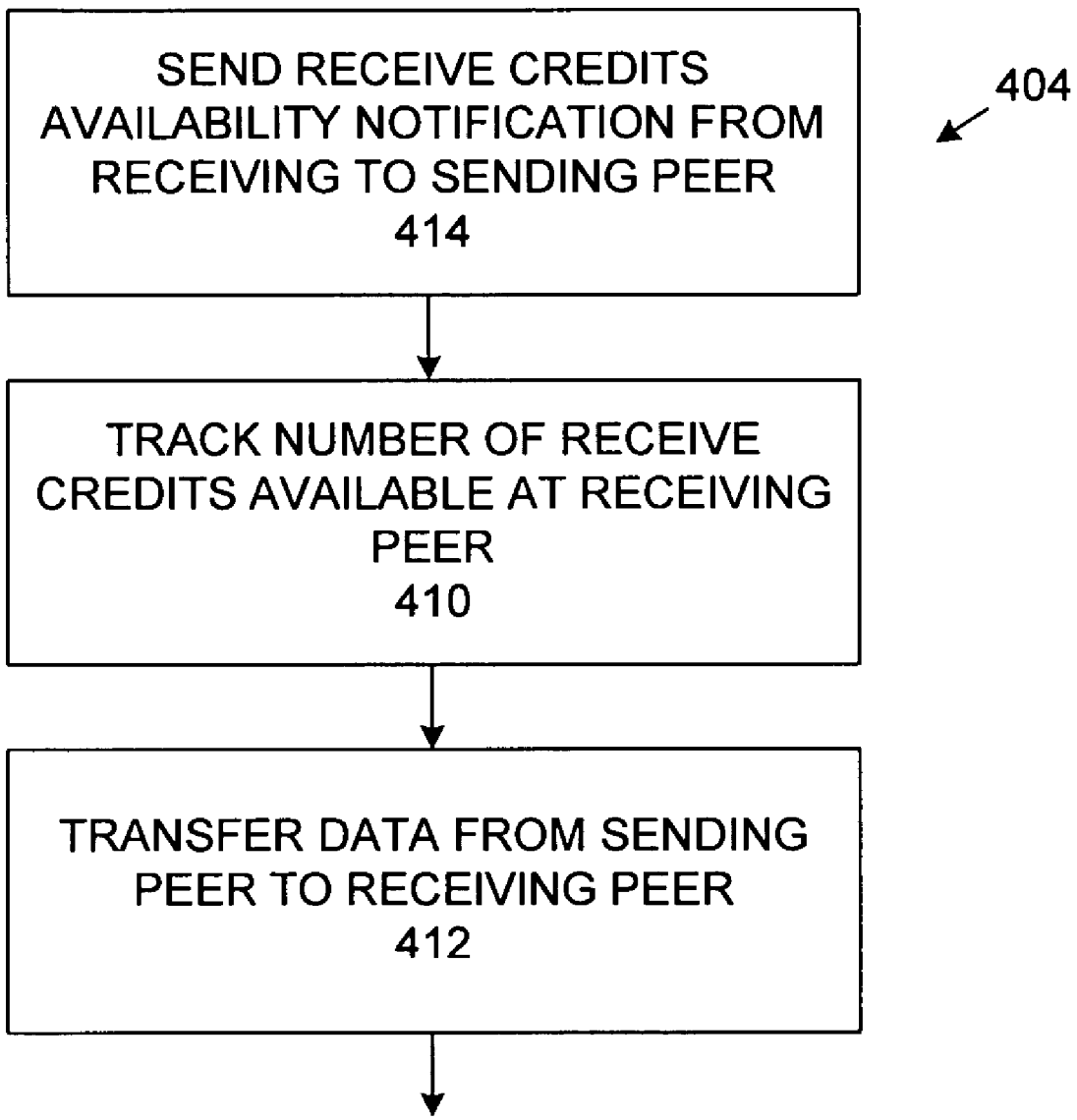

Referring to FIG. 4C, in some implementations a notification may be sent 414 from the receiving peer to the sending peer that informs the sending peer about the number of receive credits available at the receiving peer. The notification identifies which send buffers at the sending peer are completed.

Send buffers can be activated in any suitable order. For example, in a particular embodiment, the send buffers at the sending peer can be activated in round-robin order.

In an example implementation, a send buffer at the sending peer may be re-used when a previous transfer from the send buffer is completed.

Some embodiments may specify that operations queued to the send queue take at least one completion per iteration through the send queue. An iteration through a send queue is defined as the operations queued through the send queue until the send queue is full.

In Remote Direct Memory Access (RDMA) operations, at least one completion is taken per iteration. RDMA operations take a completion to improve the overall latency of operation.

The illustrative flow control applies to a type of request that can be queued to a queue pair. For example, a Work Queue Entry request comprising a Send Buffer to a Send Queue is queued. Successful processing of the request resulting in a completion of a receive Work Request Entry at the receiving peer.

For simplicity of explanation, send and receive operations may be considered to comprise single buffers. When an operation completes, completion information may be posted to a Completion Queue (CQ) associated with the connection. A completion enables the flow control protocol to retrieve the buffer associated with the original request and reuse the buffer.

The flow control protocol maintains a dedicated array of send buffers and receive buffers. Each receive buffer may be considered to be a credit. Application data is copied to and read from the buffers. Remote Direct Memory Access (RDMA) read and write operations involve the application buffer directly and do not involve the flow control protocol buffers. In an illustrative embodiment, the flow control protocol buffers may be involved in setting up an RDMA transfer but not involved in the transfer act.

Referring to FIG. 5, a table depicts an example analysis of communication system operations for comparison between the illustrative optimized flow control method and a non-optimized method. The analysis depicts benefits of the technique in terms of processor or logic utilization. For connections without Remote Dynamic Memory Access (RDMA) transfer, the optimized method reduces the number of all transfer completions, including send and receive completions, by almost half. To be accurate, assuming a Send Queue size of X, the total number of completions is ($\frac{1}{2}$+1/X) times the number of completions for the non-optimized solution. Accordingly, when the Send Queue size X is sufficiently large, the total number of completions is approximately half, about a fifty percent reduction in total completions.

For connections with a RDMA transfer, the number of total completions is reduced by about one-third, considering both sink nodes and source nodes. For example, considering an RDMA-Write operation, the table depicts completions taken in both the optimized and non-optimized methods. The analysis illustrates a reduction in total number of completions by one-third from six to four.

Several types of requests can be queued to a Queue Pair. One request type is queuing of a Work Queue Entry (WQE) including a Receive Buffer to the Receive Queue. Each Receive WQE receives data from a single send operation (Send WQE) from the sending peer.

A second request type is queuing of a Work Entry Queue including a Send Buffer to the Send Queue. The successful processing of the request results in a completion of a Receive WQE at the receive peer.

A third request type is queuing of a Work Queue Entry including a Bind or Unbind Memory Window to the Send Queue.

A fourth request type is queuing an RDMA Write and Read operation (WQE) to the Send Queue, resulting in direct data placement at the receive peer. No receive WQE is completed at the receive peer.

The technique proposed herein is operative for the second request type.

The various functions, processes, methods, and operations performed or executed by the system can be implemented as programs that are executable on various types of processors, controllers, central processing units, microprocessors, digital signal processors, state machines, programmable logic arrays, and the like. The programs can be stored on any non-transitory computer-readable medium for use by or in connection with any computer-related system or method. A non-transitory computer-readable medium is an electronic, magnetic, optical, or other physical storage device or means that can store a computer program for use by or in connection with a computer-related system, method, process, or procedure. Programs can be embodied in a non-transitory computer-readable medium for use by or in connection with an instruction execution system, device, component, element, or apparatus, such as a system based on a computer or processor, or other system that can fetch instructions from an instruction memory or storage of any appropriate type.

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims. For example, the described examples are discussed in a Windows implementation. The disclosed structures and techniques may be implemented for usage with other operating systems such as Linux, UNIX, and others. Also, although the illustrative structures and techniques are described with respect to a particular number and arrangement of sites, nodes, components, or devices, any suitable number may be implemented. Similarly, the disclosed structures and methods may be adapted for usage with any appropriate types of electronics or computer systems.

What is claimed is:

1. A Remote Direct Memory Access (RDMA) flow control method comprising:
   controlling operation flow on a per connection level;
   managing a sending peer to prevent overflow of a receiving peer's receiver credits wherein completions on send operations queued to a send queue are taken only once per iteration through the send queue; and
   allocating a number of send buffers at the sending peer greater than or equal to the maximum number of receive credits that can be indicated by the receiving peer.

2. The method according to claim 1 further comprising:
   tracking at the sending peer a number of receive credits available at the receiving peer; and transferring from the sending peer to the receiving peer only in conditions that the transfer does not overflow the receiving peer's posted receive credits.

3. The method according to claim 1 further comprising:
reusing a send buffer at the sending peer only in a condition that a previous transfer from the send buffer is completed.

4. The method according to claim 1 further comprising:
activating send buffers at the sending peer in an order selected from among a group comprising round robin, first-in-first-out (FIFO), and random order once the send buffer is validated as completed.

5. The method according to claim 1 further comprising:
sending a notification from the receiving peer to the sending peer that informs the sending peer about the number of receive credits available at the receiving peer, the notification identifying which send buffers at the sending peer are completed; and
optimizing flow control using the sent notification.

6. A Remote Direct Memory Access (RDMA) flow control apparatus comprising:
a node operative as a sending peer and adapted to control operation flow on a per connection level;
a plurality of send buffers at the node; and
a logic operative at the node that manages the sending peer to prevent overflow of a receiving peer's receiver credits wherein completions on send operations queued to a send queue are taken only once per iteration through the send queue and allocates a number of send buffers at the sending peer greater than or equal to the maximum number of receiver credits that can be indicated by the receiving peer.

7. The apparatus according to claim 6 further comprising:
a user software layer;
a network interface; and
the logic operative to control kernel bypass access to the network interface.

8. The apparatus according to claim 6 further comprising:
an application;
a protocol layer comprising a plurality of send buffers and a plurality of receive buffers, the protocol layer adapted to communicate with the application via a sockets applications programming interface (API);
a provider adapted to communicate with the protocol layer via at least one protocol applications programming interface (API);
a network interface comprising a send queue and a receive queue, the network interface adapted to communicate with the provider via a RDMA Network Interface API.

9. The apparatus according to claim 6 further comprising:
the logic adapted to track at the sending peer a number of receive credits available at the receiving peer and adapted to transfer from the sending peer to the receiving peer only in conditions that the transfer does not overflow the receiving peer's posted receive credits.

10. The apparatus according to claim 6 further comprising:
the logic adapted to reuse a send buffer at the sending peer only in a condition that a previous transfer from the send buffer is completed.

11. The apparatus according to claim 6 further comprising:
the logic adapted to send a notification from the receiving peer to the sending peer that informs the sending peer about the number of receive credits available at the receiving peer, the notification identifying which send buffers at the sending peer are completed.

12. A network comprising:
a plurality of systems, at least one of the systems plurality adapted to execute a process; and
at least one node adapted to communicate a data packet from the at least one of the systems plurality, the at least one node operative as a sending peer and adapted to control operation flow on a per connection level, the at least one node further comprising:
a plurality of send buffers at the node; and
a logic operative at the node that manages the sending peer to prevent overflow of a receiving peer's receiver credits wherein completions on send operations queued to a send queue are taken only once per iteration through the send queue and allocates a number of send buffers at the sending peer greater than or equal to the maximum number of receiver credits that can be indicated by the receiving peer.

13. The network according to claim 12 wherein the at least one node further comprises:
a user software layer;
a network interface; and
the logic operative to control kernel bypass access to the network interface.

14. The network according to claim 12 wherein the at least one node further comprises:
an application;
a protocol layer comprising a plurality of send buffers and a plurality of receive buffers, the protocol layer adapted to communicate with the application via a sockets applications programming interface (API);
a provider adapted to communicate with the protocol layer via at least one protocol applications programming interface (API);
a network interface comprising a send queue and a receive queue, the network interface adapted to communicate with the provider via a RDMA Network Interface API.

15. The network according to claim 12 wherein the at least one node further comprises:
the logic adapted to track at the sending peer a number of receive credits available at the receiving peer and adapted to transfer from the sending peer to the receiving peer only in conditions that the transfer does not overflow the receiving peer's posted receive credits.

16. The network according to claim 12 wherein the at least one node further comprises:
the logic adapted to reuse a send buffer at the sending peer only in a condition that a previous transfer from the send buffer is completed.

17. The network according to claim 12 wherein the at least one node further comprises:
the logic adapted to send a notification from the receiving peer to the sending peer that informs the sending peer about the number of receive credits available at the receiving peer, the notification identifying which send buffers at the sending peer are completed.

18. An article of manufacture comprising:
a non-transitory computer readable medium having a computer readable program code embodied therein adapted to control communication flow in a network, the computer readable program code further comprising:
a code adapted to cause the controller to control Remote Direct Memory Access (RDMA) operation flow on a per connection level;
a code adapted to cause the controller to manage a sending peer to prevent overflow of a receiving peer's receiver credits wherein completions on send operations queued to a send queue are taken only once per iteration through the send queue; and a code adapted to cause the controller to allocate a number of send buffers at the sending peer greater than or equal to the maximum number of receive credits that can be indicated by the receiving peer.

19. The article of manufacture according to claim 18 wherein the computer readable program code further comprises:

a code adapted to cause the controller to track at the sending peer a number of receive credits available at the receiving peer; and a code adapted to cause the controller to transfer from the sending peer to the receiving peer only in conditions that the transfer does not overflow the receiving peer's posted receive credits.

20. The article of manufacture according to claim 18 wherein the computer readable program code further comprises:

a code adapted to cause the controller to reuse a send buffer at the sending peer only in a condition that a previous transfer from the send buffer is completed.

* * * * *